Jan. 2, 1923.

C. F. COWDREY.
BRAKE TESTING DEVICE FOR VEHICLE WHEELS.
FILED JAN. 17, 1922.

Inventor:
Charles F. Cowdrey
by Robt. F. Haines
Attorney

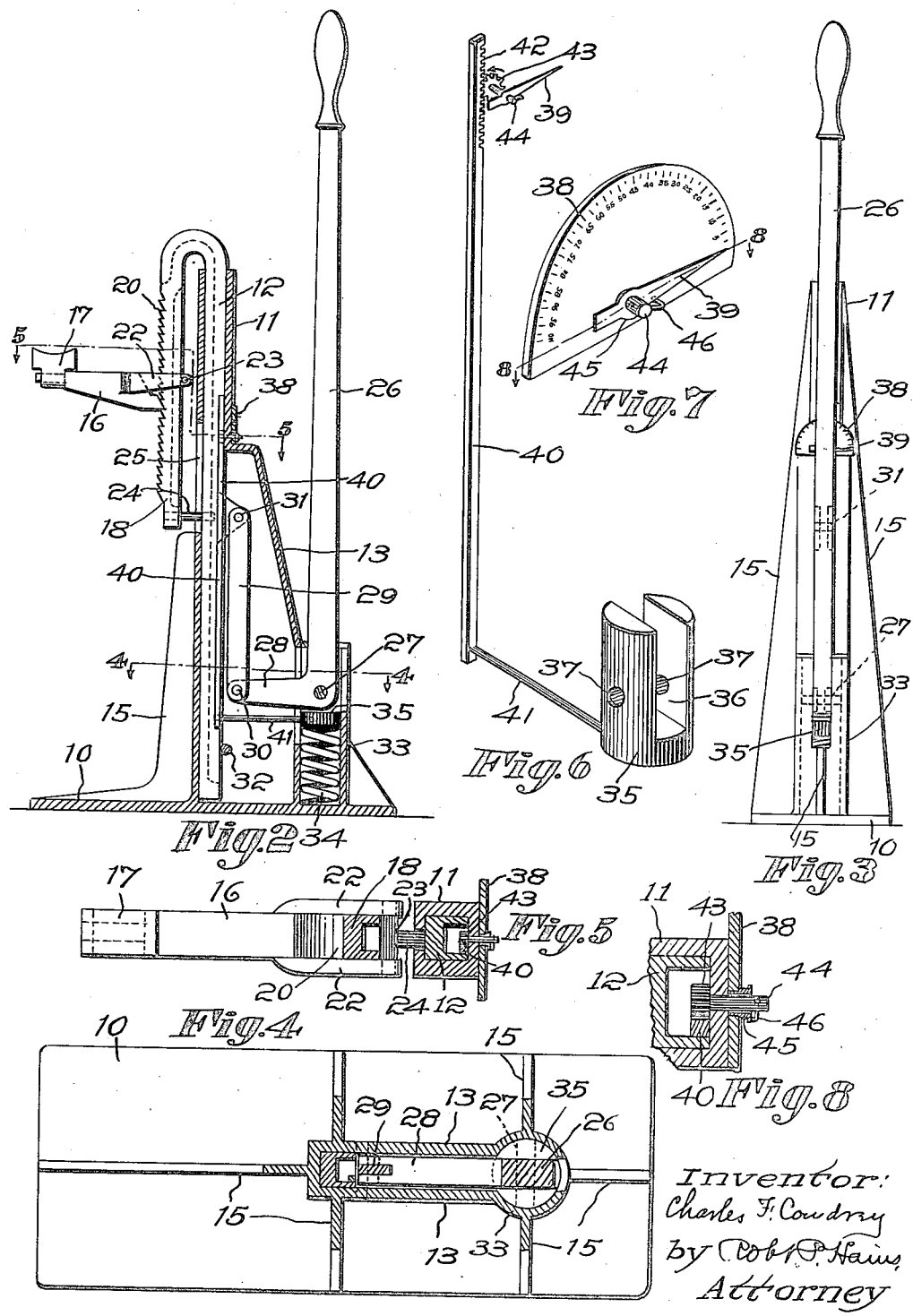

Patented Jan. 2, 1923.

1,440,972

UNITED STATES PATENT OFFICE.

CHARLES F. COWDREY, OF FITCHBURG, MASSACHUSETTS.

BRAKE-TESTING DEVICE FOR VEHICLE WHEELS.

Application filed January 17, 1922. Serial No. 529,984.

*To all whom it may concern:*

Be it known that I, CHARLES F. COWDREY, a citizen of the United States, residing at Fitchburg, in the county of Worcester and State of Massachusetts, have invented an Improvement in Brake-Testing Devices for Vehicle Wheels, of which the following description, in connection with the accompanying drawings, is a specification, like characters on the drawings representing like parts.

This invention relates to means for testing the action of a brake upon the wheels of a vehicle, in order that any inequality in the brake action may be readily equalized and made uniform.

Unless the action of the brake upon the wheels of a vehicle at opposite sides thereof is the same or substantially so, the movement of the vehicle on the application of the brake is liable to cause the vehicle itself to swerve from its direct path of movement, due to the inequality of freedom from rotation of the wheels at opposite sides of the vehicle. Such inequality in the brake action at opposite sides of the vehicle is one of the large factors that enters into many of the accidents which are now prevalent, more especially in automobile travel.

Where, as in the usual automobile construction, the two wheels at the opposite sides of the automobile are connected together by a differential gearing driven from the motor, any inequality of the brake motion upon the wheels at opposite sides of the automobile is liable to be the fruitful source of accidents and other trouble. These facts are recognized in the automobile industry, and equalization of brake action on the wheels at opposite sides of the automobile is sought by hand adjustment of the brakes, whether of the band or shoe type. Such hand adjustment without means for comparing the action of the brakes, is guess-work, and in most instances the brakes on the wheels at the opposite sides of the automobile do not act with the the same energy.

In testing the action of a brake upon the wheels of a vehicle, the test should be made while the brake is applied with substantial force, because the relative braking effect upon the opposite wheels of a vehicle may vary with the force with which the brake is applied, and while it is desirable that the brake should operate equally on both wheels irrespective of the force with which the brake is applied, the effect of an unequally adjusted brake upon an automobile is more pronounced when the brake is applied hard. Heretofore in adjusting brakes it has been customary to turn the vehicle wheels by hand while the brake is applied, to estimate its braking effect, but obviously this cannot be done when the brake is applied with substantial force.

Having the above matters in mind, one of the purposes of the present invention is to provide novel means for turning a wheel of an automobile under brake resistance, and operable with sufficient force to turn the wheel while the brake is applied with substantial force.

Another purpose of the invention is to provide novel mechanism for indicating the force required to effect turning movement of a wheel under brake resistance.

Still another purpose of the invention is to provide a brake-testing device that is simple and durable in construction and that is inexpensive to manufacture.

The above and other purposes of the invention and novel combination of parts will be hereinafter described in connection with the accompanying drawings which show one good, practical form of the invention.

In the drawings:

Fig. 2 is a vertical sectional view through the brake tester of Fig. 1;

Fig. 3 is a rear elevation of the brake tester;

Fig. 4 is an enlarged sectional view taken on the line 4—4 of Fig. 2;

Fig. 5 is an enlarged sectional view taken on the line 5—5 of Fig. 2;

Fig. 6 is a perspective view of mechanism for operating the indicator;

Fig. 7 is a perspective view of the indicator; and

Fig. 8 is an enlarged sectional view on line 8—8 of Fig. 7.

Figure 1:
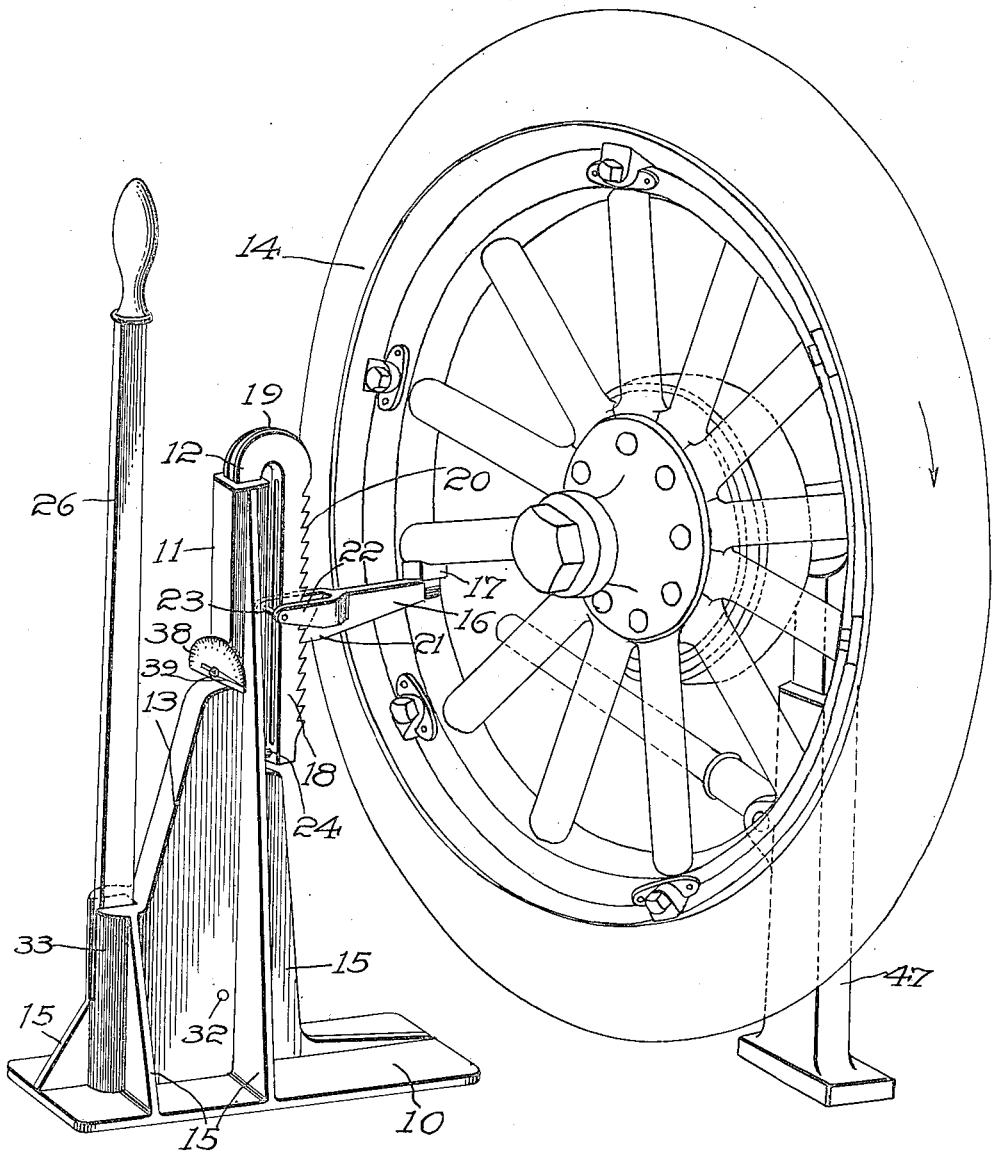
Fig. 1 is a perspective view of an automobile wheel showing a brake-tester constructed in accordance with the present invention associated therewith.

In the embodiment of the invention illustrated, a supporting stand is provided having a base 10 and a column 11 extending upwardly therefrom. The column 11 is formed hollow to slidably support the post 12 and preferably has an enlargement 13 at one side that forms a housing for mechanism to be described. The construction of the supporting stand should be such that it serves to support the post 12 in an upright position adjacent an automobile wheel 14, as shown in Fig. 1, and preferably the stand is in the form of a casting having reinforcing flanges 15 extending upwardly from the base 10.

The post 12 is shown as extending from near the lower end of the column 11 upwardly through the upper end of the column, and is substantially square in cross section, while the upper part of the column 11 has a corresponding configuration as will be apparent from Fig. 5. This serves to prevent the post from rotating about its longitudinal axis and permits the posts to slide up or down within the column.

It is desirable that a turning movement be imparted to the wheel 14 by upward movement of the post 12, and to this end, the post carries a laterally extending arm 16 upon the outer end of which is provided wheel engaging means, in the present instance, comprising a saddle 17 rockingly mounted upon the arm 16 and adapted to engage a spoke of the wheel as clearly shown in Fig. 1.

It is desirable that the arm 16 be adjustable lengthwise of the post 12 to facilitate its engagement with spokes at different elevations from the ground, and to this end the post 12 is provided with a toothed rack 18 supported in spaced relation to the post. In the present instance the rack 18 is connected to the post 12 by a U-shaped portion 19, and the rack is provided with teeth 20 which cooperate with tooth engaging means 21 rigid upon the arm 16. The arm 16 has side members 22 that straddle the rack, and a pin 23 extending between the side members normally rests against the inner wall of the rack 18. The construction is such that the arm 16 may be readily raised or lowered upon the rack by tilting its outer end upward sufficient to disengage the means 21 from the teeth of the rack, and downward pressure upon the arm serves to secure the arm in its adjusted position upon the rack. A pin 24 may be provided at the lower end of the rack 18 to prevent the arm 16 from escaping from the lower end of the rack and it may serve also to maintain the rack properly spaced from the post 12, and the column 11 preferably is provided with a slot 25 to receive this pin.

Various means may be provided for imparting a lifting movement to the post 12 and one simple and satisfactory means for accomplishing this through the operation of a lever will now be described. The supporting stand is provided with a lever 26 pivoted at 27 and having an extension 28 adjacent the pivot 27 and projecting from the lever at an angle, the extension 28 is connected to the post 12 by a link 29 having one end pivoted to the extension at 30 and its other end pivoted at 31 to a lug upon the post 12. The arrangement is such that movement of the lever 26 downwardly about its pivot 27 raises the extension 28, which in turn lifts the post 12. A pin 32 may be provided near the lower end of the post 12 to guide the post in its upward movement.

It is important to provide means for indicating the force required to effect turning movement of the wheel under brake resistance, and to this end, in the present instance, the supporting stand has a tubular chamber 33 in which is mounted a coiled spring 34, and upon this spring rests a block 35 (see Fig. 6) slotted at 36 to form spaced walls between which the lever 26 is pivotally mounted by inserting the pin 27 within the holes 37 of the block. The arrangement is such that the block 35 may slide within the chamber 33 and move downwardly by compressing the spring 34 as the load placed on the block by the lever increases.

In order to indicate the downward movement of the block 35, an indicator is provided comprising a dial plate 38 and a cooperating pointer 39, and the indicator preferably is mounted upon the column 11 at a point sufficiently elevated to enable it to be easily read by a person operating the lever 26. In the present instance the indicator is mounted upon the column 11 above the housing 13, as shown, where it may be easily read and at the same time is protected. The means shown for imparting movement of the block 35 to the indicator consists of an upwardly extending rod 40 connected at its lower end to a pin 41 extending outwardly from the block 35, and the upper portion of the rod 40 is provided with rack teeth 42 cooperating with a pinion 43 upon the stub shaft 44. The arrangement is such that movement of the block 35 serves to rotate the shaft 44.

It is desirable to have the pointer 39 remain in the maximum position to which it is adjusted, and to this end the pointer is pivotally secured at 45 to the dial 38 to rotate independent of the shaft 44 and preferably works sufficiently stiff to remain in the position to which it is adjusted. The shaft 44 is provided with a bent arm 46 that serves to rotate the pointer in one direction but not in the other.

In testing the brakes of a vehicle with the mechanism of the present invention, the wheel 14 should be relieved from the weight of the vehicle by the use of a jack 47 or any other convenient means, and the brake to be tested is applied. The arm 16 is then adjusted to bring its saddle 17 into engagement with a spoke of the wheel as shown in Fig. 1. The lever 26 is now forced downward and the force required to effect turning movement of the wheel will be recorded upon the indicator 38. Then the action of the brake upon the opposite wheel is similarly tested to determine the relative brake action upon the two wheels.

Claims:

1. A brake tester for testing the brake resistance to the turning movement of vehicle wheels, comprising, in combination, a support, a post guided by the support for vertical movement, an arm carried by the post and having wheel engaging means, means for exerting a lifting force upon said post sufficient to turn a wheel under brake resistance, comprising a pivoted lever and a link connection between the post and lever, and means connected to the lever actuated parts for indicating the force required to effect turning movement of the wheel.

2. A brake tester for testing the brake resistance to the turning movement of vehicle wheels, comprising, in combination, a support, an arm extending from the support and having wheel engaging means, means for imparting a lifting movement to said arm to exert a turning force upon a wheel to turn the wheel under brake resistance, comprising a lever having an extension projecting therefrom at an angle, and a link connected to said extension and operable to impart lifting movement to said arm, and means connected to the lever for indicating the force required to effect turning movement of the wheel.

3. A brake tester for vehicle wheels, comprising, in combination, a support, a post guided by the support for vertical movement and having wheel engaging means, means for exerting a lifting force upon said post sufficient to turn a wheel under brake resistance, means yieldable under the downward pressure of said post, an indicator mounted a substantial distance above said yielding means, and a connection between the yielding means and indicator adapted to actuate the latter to indicate the force required to effect turning movement of the wheel.

4. A brake tester for vehicle wheels, comprising, in combination, a support, an arm extending from said support and having wheel engaging means, means for imparting a lifting movement to said arm to exert a turning force upon a wheel to turn the wheel under brake resistance, means yieldable with the increase in lifting force applied to said arm, an indicator disposed a substantial distance above said yielding means, and a connection between the yielding means and indicator adapted to actuate the latter to indicate the force required to effect turning movement of the wheel.

5. A brake tester for testing the brake resistance to the turning movement of vehicle wheels, comprising, in combination, a support, a post guided by the support for vertical movement, a toothed rack upon the post, an arm having adjustable engagement with said rack and having wheel engaging means, tooth engaging means rigid with said arm and adapted to support the arm in its adjusted position, means for exerting a lifting force upon said post sufficient to turn a wheel under brake resistance, and means connected to the lifting means for indicating the force required to effect turning movement of the wheel.

6. A brake tester for testing the brake resistance to the turning movement of vehicle wheels, comprising, in combination, a support, a post guided by the support for vertical movement, a toothed rack carried by the post and secured in spaced relation to one side of the post to provide a clearance space between said rack and post, an arm adjustable lengthwise of the rack, tooth engaging means upon the arm and adapted to support the arm in its adjusted position, means for exerting a lifting force upon said post to turn a wheel under brake resistance, and means connected to the lifting means for indicating the force required to effect turning movement of the wheel.

7. A brake tester for vehicle wheels, comprising, in combination, a support, a post guided by the support for vertical movement and having wheel engaging means, means for imparting an upward movement to said post to turn a wheel under brake resistance, means yieldable under the downward pressure of said post, an indicator mounted upon the support at a substantial distance above said yielding means, and a rod extending upwardly from the yielding means to actuate the indicator to indicate the force required to effect turning movement of the wheel.

8. A brake tester for testing the brake resistance to the turning movement of vehicle wheels, comprising, in combination, an upstanding column having a supporting base, a post movable vertically relative to the column, wheel engaging means upon the post adapted to impart a turning movement to a wheel, lever actuated means for imparting a lifting movement to the post to turn the wheel under brake resistance, and an indicator mounted upon the column at a substantial distance above the base and connected to said lever actuated means to indicate the force required to effect turning movement of the wheel.

In testimony whereof, I have signed my name to this specification.

CHARLES F. COWDREY.